(12) United States Patent
Ritchie

(10) Patent No.: US 10,855,369 B2
(45) Date of Patent: Dec. 1, 2020

(54) MOBILE DEVICE FOR OPTICAL WIRELESS COMMUNICATION

(71) Applicant: PURELIFI LIMITED, Edinburgh (GB)

(72) Inventor: Steven Ritchie, Edinburgh (GB)

(73) Assignee: PURELIFI LIMITED, Edinburgh (GB)

(*) Notice: Subject to any disclaimer, the term of this patent is extended or adjusted under 35 U.S.C. 154(b) by 0 days.

(21) Appl. No.: 16/552,818

(22) Filed: Aug. 27, 2019

(65) Prior Publication Data

US 2019/0386745 A1 Dec. 19, 2019

Related U.S. Application Data

(63) Continuation of application No. 15/955,533, filed on Apr. 17, 2018, now Pat. No. 10,439,714.

(30) Foreign Application Priority Data

Apr. 18, 2017 (GB) .................................... 1706144.1
Aug. 15, 2017 (GB) .................................... 1713090.7

(51) Int. Cl.
| | | |
|---|---|---|
| *H04B 10/11* | (2013.01) | |
| *H04B 10/114* | (2013.01) | |
| *H04B 17/318* | (2015.01) | |
| *H04B 10/40* | (2013.01) | |
| *H04B 10/50* | (2013.01) | |

(Continued)

(52) U.S. Cl.
CPC ......... *H04B 10/11* (2013.01); *H04B 10/1143* (2013.01); *H04B 10/1149* (2013.01); *H04B 10/40* (2013.01); *H04B 17/318* (2015.01); *H04B 10/50* (2013.01); *H04B 10/60* (2013.01); *H04W 88/02* (2013.01)

(58) Field of Classification Search
None
See application file for complete search history.

(56) References Cited

U.S. PATENT DOCUMENTS

| | | |
|---|---|---|
| 9,431,442 B2 | 8/2016 | Vittu |
| 9,654,222 B1 | 5/2017 | Shatz |

(Continued)

FOREIGN PATENT DOCUMENTS

| | | |
|---|---|---|
| CN | 203057250 | 7/2013 |
| CN | 105450302 | 3/2016 |

(Continued)

OTHER PUBLICATIONS

Ben Eisenman et al., "iPhone 3GS Rear Panel Replacement", https://www.ifixit.com/Guide/iPhone+3GS+Rear+Panel+Replacement/1551, retrieved Mar. 15, 2020, published at least as early as 2009 based on date stamped comments (Year: 2009).*

(Continued)

*Primary Examiner* — Darren E Wolf

(74) *Attorney, Agent, or Firm* — Snell & Wilmer L.L.P.

(57) ABSTRACT

A mobile device comprises a plurality of transmitters and receivers, each configured for optical wireless communication, wherein the plurality of transmitters and/or receivers are arranged on at least three surfaces of the mobile device such that each of the three surfaces has a respective at least one of the transmitters and/or each of the three surfaces has a respective at least one of the receivers.

27 Claims, 9 Drawing Sheets

(51) Int. Cl.
*H04B 10/60* (2013.01)
*H04W 88/02* (2009.01)

(56) References Cited

U.S. PATENT DOCUMENTS

| | | | |
|---|---|---|---|
| 2002/0122637 A1* | 9/2002 | Anderson | G02B 6/4201 |
| | | | 385/89 |
| 2002/0126358 A1 | 9/2002 | Volpi et al. | |
| 2006/0203140 A1* | 9/2006 | Kim | G02F 1/133615 |
| | | | 349/58 |
| 2013/0272223 A1 | 10/2013 | Mathews | |
| 2015/0085184 A1 | 3/2015 | Vidal | |
| 2019/0273909 A1* | 9/2019 | Ye | H04N 5/2253 |

FOREIGN PATENT DOCUMENTS

| | | |
|---|---|---|
| EP | 0027833 | 5/1981 |
| GB | 2298752 | 9/1996 |
| JP | 2004289336 | 10/2004 |
| JP | 2005033564 | 2/2005 |
| KR | 1020130116452 | 10/2013 |
| WO | 9212580 | 7/1992 |
| WO | 201133590 | 10/2011 |
| WO | 2018018367 | 2/2018 |

OTHER PUBLICATIONS

Search Examination Report dated Oct. 16, 2018 in UK Application No. GB1806351.1.
Non-Final Office Action dated Dec. 13, 2018 in U.S. Appl. No. 15/955,533.

* cited by examiner

MOBILE DEVICE FOR OPTICAL WIRELESS COMMUNICATION

CROSS-REFERENCE TO RELATED APPLICATIONS

This Application is a continuation of, claims priority to and the benefit of, U.S. Ser. No. 15/955,533 filed on Apr. 17, 2018 titled "MOBILE DEVICE FOR OPTICAL WIRELESS COMMUNICATION." The '533 application claims priority to and benefit of GB Application No. 1706144.1 filed on Apr. 18, 2017 and GB Application No. 1713090.7 filed on Aug. 15, 2017. All of which are incorporated herein by reference in their entirety for all purposes.

FIELD

The present invention relates to an optical wireless communication device.

BACKGROUND

Optical wireless communication can offer advantages over conventional radio frequency (RF) wireless communication, and has been implemented using a variety of devices. In optical wireless communication systems, line of sight (LoS) communication is generally required for reliable signal detection. A field of view of the transmitter and/or receiver may be limited for practical considerations. Such a limited field of view may cause loss of a signal between two devices in some circumstances. This is of particular importance when optical wireless communication is implemented in a mobile device.

SUMMARY

According to a first aspect, there is provided a mobile device comprising a plurality of transmitters and receivers, each configured for optical wireless communication, wherein the plurality of transmitters and/or receivers are arranged on at least three surfaces of the mobile device such that each of the three surfaces has a respective at least one of the transmitters and/or each of the three surfaces has a respective at least one of the receivers.

The at least three different surfaces may comprise two opposing surfaces and a surface that is substantially orthogonal to the two opposing surfaces.

The plurality of transmitters and/or receivers may be arranged so that each transmitter and/or each receiver has a different field of view.

The plurality of transmitters may be arranged to have a combined field of view of at least 180 degrees, optionally at least 270 degrees, optionally at least 360 degrees.

The plurality of receivers may be arranged to have a combined field of view of at least 180 degrees, optionally at least 270 degrees, optionally at least 360 degrees.

A field of view of at least one of the transmitters may be substantially orthogonal to a field of view of at least one other of the transmitters.

A field of view of at least one of the receivers may be substantially orthogonal to the field of view of at least one other of the receivers.

The device may further comprise a flexible printed circuit board, wherein at least some of the plurality of transmitters and/or plurality of receivers are provided on the flexible printed circuit board.

The device may further comprise at least one light barrier between at least one of the transmitters and/or receivers and at least one other of the transmitters and/or receivers.

The at least one light barrier may comprise at least one light barrier between at least one of the transmitters and at least one other of the transmitters, and/or at least one light barrier between at least one of the receivers and at least one other of the receivers.

The device may be configured to communicate using a further communication protocol in addition to optical wireless communication.

The further communication protocol may comprise at least one of: a radio-frequency communication protocol, wireless mobile telecommunication, Wi-Fi, global positioning system, short message service, multimedia message service, Ethernet connection.

The device may comprise at least one of: a smartphone, a mobile telephone, a tablet, a laptop or other communication and/or computing device.

The device may further comprise a processing resource configured to control an optical wireless communication transmission or reception process.

The processing resource may be configured to select one or more of the transmitters for use in the transmission process and/or to selectively control an output power of each of the transmitters in the transmission process, in dependence on one or more of received signal strength, received signal quality, position of the mobile device, orientation of the mobile device.

The processing resource may be configured to select one or more of the receivers for use in the reception process or to selectively process received signals from the receivers, in dependence on one or more of received signal strength, received signal quality, position of the mobile device, orientation of the mobile device.

The plurality of transmitters and receivers may comprise a plurality of transmitter and receiver pairs. Each receiver may comprise at least one photodiode. Each receiver may comprise a plurality of photodiodes arranged in an array. Each transmitter may comprise at least one light emitting diode. Each transmitter may comprise a plurality of light emitting diodes arranged in an array. The transmitter and receiver pairs may be mounted in a transceiver enclosure.

Each transmitter and/or receiver may have an associated optical component for directing light to and/or from the associated transmitter and/or receiver.

Each of the transmitters may be configured to modulate light at a modulation frequency between 1 Hz and 10 THz, optionally between 1 kHz and 100 GHz, further optionally between 100 kHz and 10 GHz.

The device may further comprise an orientable member, wherein the orientable member comprises at least one of the receivers and/or wherein the orientable member comprises at least one of the transmitters. The device may further comprise a rotation mechanism operable to provide rotation of the orientable member relative to the mobile device about a rotation axis and, optionally, to maintain the orientable member in a rotated position following completion of said rotation.

The rotation axis may be substantially parallel to at least one of the at least three surfaces, and/or substantially orthogonal to at least one of the at least three surfaces.

The rotation mechanism may be configured such that the orientable member is rotatable around said rotation axis by at least 90 degrees.

The rotation mechanism may be operable to provide rotation of at least part of the orientable member relative to the mobile device with respect to the rotation axis and with respect to a further rotation axis orthogonal to said rotation axis.

The orientable member may comprise a first portion and a second portion, and the second portion may be orientable relative to the first portion.

The first portion of the orientable member may be rotatably coupled to the second portion of the orientable member.

The first portion of the orientable member may be orientable by rotation relative to the connector member about a first axis by a first range of angles and the second portion of the orientable member is orientable by rotation relative to the first portion about a second axis by a second range of angles.

The first axis may be substantially orthogonal to the second axis or the first axis is substantially parallel to the second axis.

The first and second axes may be collinear such that the second portion is operable to rotate about an angle equal to the sum of the first angle and the second angle.

Orientation of the orientable member may comprise rotation of the first portion and rotation of the second portion.

At least one the plurality of the transmitters and/or receivers may be provided on the first portion and at least one of the plurality of the transmitters and/or receivers is provided on the second portion.

The orientable member may be manually orientable by a user.

The device may further comprise a drive arrangement operable to orient the orientable member. The drive arrangement may be electrically, magnetically and/or electro-magnetically powered.

The device may further comprise an indicator for indicating signal strength of signals received at the receiver and/or transmitted by the transmitter.

The indicator may comprise a visual indicator, for example, a light or a display.

The indicator may be configured to provide an indication signal in response to signal strength being greater than or equal to a threshold value.

The device may further comprise a controller configured automatically to control orientation of the orientable member.

The controller is configured to control orientation of the orientable member based on at least one of:
a) signal strength of at least one signal received at the receiver or transmitted by the transmitter;
b) a control signal received from a further device or at least one additional device;
c) a measurement of orientation of the orientable device and/or the further device and/or a measurement of relative orientation of the orientable device and the further device.

In a further aspect of the invention, which may be provided independently, there is provided a method of adapting a mobile device for optical wireless communication comprising installing a plurality of transmitters and receivers, each configured for optical wireless communication, wherein the installing of the plurality of transmitters and/or receivers comprises arranging the plurality of transmitters and/or receivers on at least three surfaces of the mobile device such that each of the three surfaces has a respective at least one of the transmitters and/or each of the three surfaces has a respective at least one of the receivers.

In another aspect there is provided a method of operating a device as claimed or described herein to provide optical wireless communication, comprising at least one of a) and b):

a) selecting one or more of the transmitters for use in an optical wireless transmission process and/or selectively controlling an output power of each of the transmitters, in dependence on one or more of received signal strength, received signal quality, position of the mobile device, orientation of the mobile device;

b) selecting one or more of the receivers for use in an optical wireless reception process or selectively processing received optical wireless signals from the receivers, in dependence on one or more of received signal strength, received signal quality, position of the mobile device, orientation of the mobile device.

In a further aspect, which may be provided independently, there is provided a mobile device comprising: a plurality of transmitters and receivers, each configured for optical wireless communication, an orientable member, wherein the orientable member comprises at least one of the receivers and/or wherein the orientable member comprises at least one of the transmitters. The mobile device may further comprise a rotation mechanism operable to provide rotation of the orientable member relative to the mobile device about a rotation axis and to maintain the orientable member in a rotated position following completion of said rotation.

In a further aspect, which may be provided independently, there is provided a wireless optical communication connector device comprising: at least one of a transmitter configured for optical wireless communication and a receiver configured for optical wireless communication, wherein at least one of the transmitter or receiver is configured for optical wireless communication using visible light; a connector member comprising a male or female connector for detachable insertion into a corresponding female or male connector to provide a data interface between the device and a further device; an orientable member comprising at least one of the transmitter and the receiver; a rotation mechanism operable to provide rotation of the orientable member relative to the connector about a rotation axis and to maintain the orientable member in a rotated position following completion of said rotation.

Features in one aspect may be applied as features in any other aspect in any suitable combination. For example, device features may be applied as method features and vice versa.

BRIEF DESCRIPTION OF THE DRAWINGS

Various aspects of the invention will now be described by way of example only, and with reference to the accompanying drawings, of which.

DETAILED DESCRIPTION OF THE DRAWINGS

The term light as used herein may refer to electromagnetic waves with wavelengths in a range 1 nm to 2500 nm. Light may include ultraviolet, visible light and near-infrared electromagnetic radiation.

Figure 1:
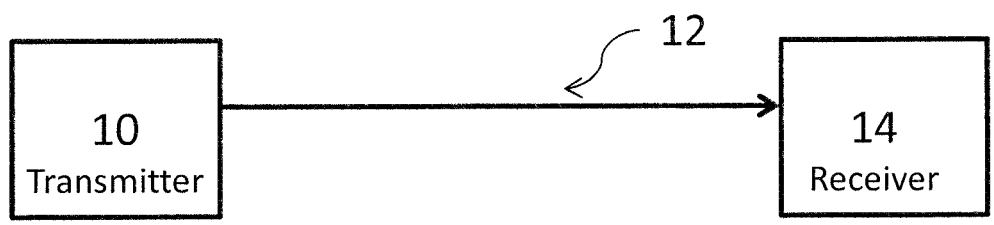
FIG. 1 is a block diagram of a wireless optical communication system.

FIG. 1 is a schematic block diagram illustrating principles of optical wireless communication according to embodiments. A transmitter 10 is configured to send a wireless optical signal in which information is encoded through an optical communication channel 12 to a receiver 14. The optical communication channel 12 may be a free-space communication channel.

The transmitter 10 includes a light emitting diode (LED), or other suitable light source, and an associated driving circuit to drive the LED to produce the optical signal. The associated driving circuitry includes a digital to analogue convertor configured to provide a modulation signal at a frequency characteristic of an optical light communication signal. A further processor (not shown) modulates data onto a drive current and the driving circuitry provides the drive current to the LED. The LED then produces an outgoing modulated optical wireless communication signal that carries the data.

The receiver 14 includes a photo-diode, or other suitable light detector, with associated circuitry to condition any received signal. The photo-diode converts received light to an electronic signal which is then conditioned by the conditioning circuitry. Conditioning may include one or more filter steps; amplification of a weak electrical signal; equalisation of received signals and converting the analogue signals into digital signals using an analogue to digital convertor. The digital signals can then be provided to a further processor to be demodulated to extract communication data.

Any suitable modulation scheme may be used, for example non on-off keying modulation schemes are used in some embodiments, and the demodulation is a demodulation from the non on-off keying modulation scheme. In further embodiments, on-off keying modulation schemes may be used. Other non-complex modulation schemes, for example modulation schemes that do not include or that are not based on real and imaginary parts, may be implemented in some other embodiments.

Reliable optical wireless communication relies on line of sight between the transmitter and receiver. Each transmitter has a characteristic field of view, in which a corresponding receiver can receive an optical signal from the transmitter. Each receiver also has a characteristic field of view, in which a corresponding transmitter can transmit an optical signal to the transmitter.

A device may have both a transmitter and a receiver thereby allowing the device to transmit and receive optical wireless communication signals. A transmitter and receiver may be paired together as a transceiver configured to transmit and receive optical wireless communication signals. The receiver may be configured to receive light signals at a first wavelength and the transmitter is configured to transmit at a second wavelength to access points. For example, the outgoing light signal may be an infrared signal generated by an infrared diode and the incoming light may be a visible light signal.

By receiving light signals at a first wavelength and transmitting light signals at a second, different wavelength, a full duplex communications capability may be provided. Different wavelengths may be used for uplink (communication from access points to the device) and for downlink (communication from the device to access points). The device may receive on the first wavelength at the same time as transmitting on the second wavelength.

Each transceiver may have its own optics implemented to guide light to and from the transceiver and/or to intensify light. The optics may be provided as a separate optical component or could be moulded with the transceiver. Separate optical components may be provided for the receiver and the transmitter. The optics and transceiver may together define the field of view of the transceiver.

The transceivers may be detachable from the mobile device. The transceivers may be designed as plug-in components that may be removed, replaced or refitted. The transceivers may be swapped to provide different fields of view, either by an end user or in a factory setting. The transceivers may be swapped to enable different wavelengths of operation. Any one or more of the transceivers may be swapped for any one or more further transceivers, which may have different fields of view and/or wavelengths to the original transceivers.

Figure 2A:
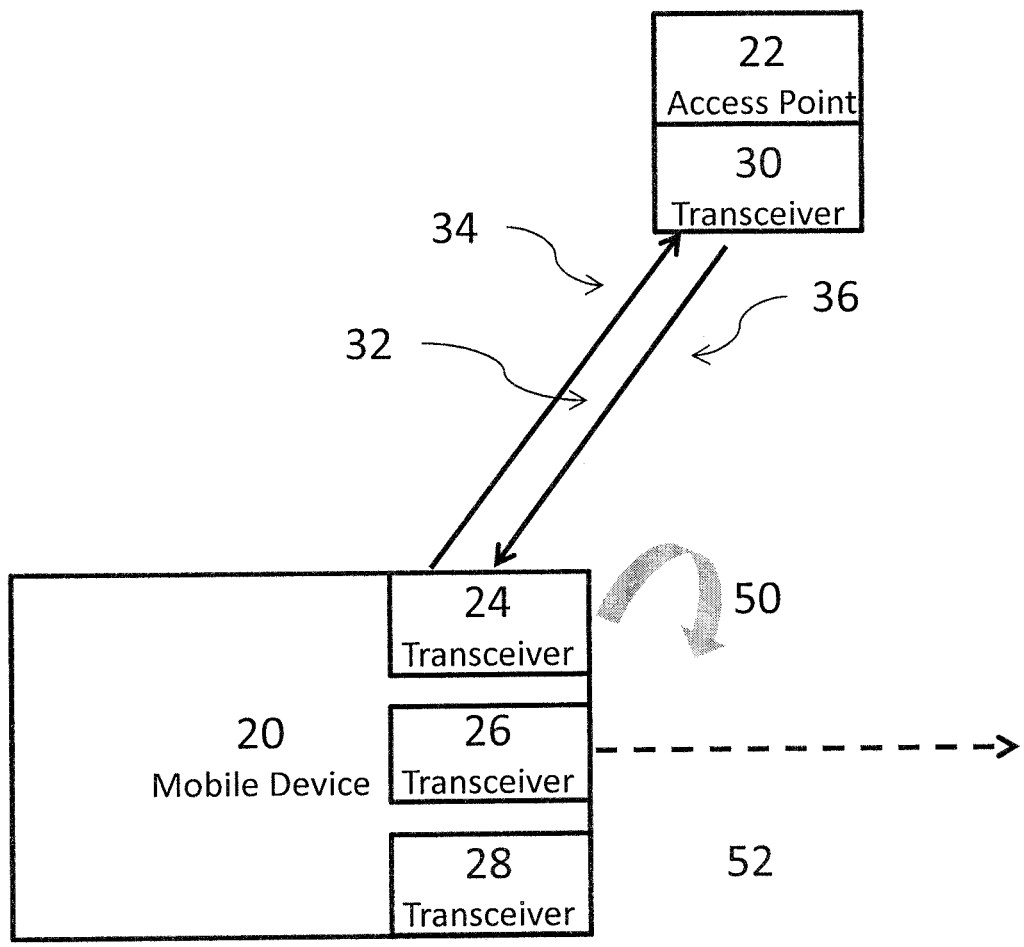
FIGS. 2(a) and 2(b) are schematic diagrams of a mobile device, in a first orientation, communicating with a remote device using optical wireless communication.
Figure 2B:
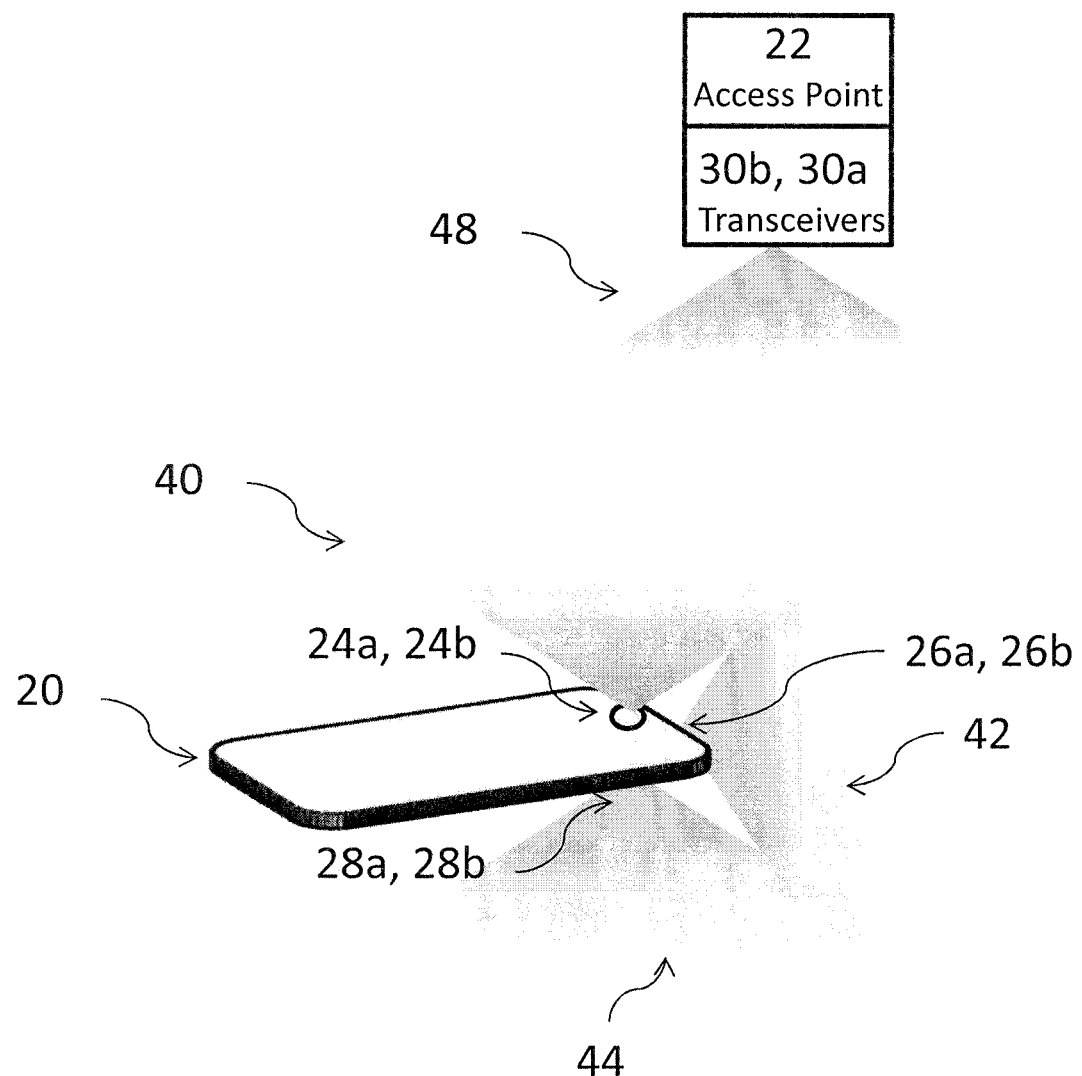

FIGS. 2(a) and 2(b) shows a mobile device 20 according to an embodiment and a remote device, for example an access point 22, communicating using optical wireless communication. The mobile device 20 has three transceivers, each transceiver configured to communicate using optical wireless signals. The access point 22 may be a fixed device, for example, a wireless access point. The access point 22 has a transceiver 30 configured to communicate using optical wireless signals. The access point 22 may have more than one transceiver.

The transceivers of the mobile device 20 are transmitter and receiver pairs, as described with reference to FIG. 1. The transceiver of the access point 22 is a transmitter and receiver pair, as described with reference to FIG. 1. The transceiver is configured to provide full duplex communications capability. In this embodiment the transceiver of the mobile device emits optical signals having a first wavelength, for example infrared light, and receives light having a second wavelength, for example, light in the visible spectrum. In contrast, the transceiver 30 of the access point 22 device receives optical signals having a first wavelength, for example infrared light, and emits light having a second wavelength, for example, light in the visible spectrum. The transmitters are configured to transmit as required utilising direction of light source information from the receivers. This transmission may be controlled by an algorithm. The outputs can be used as single outputs or combined appropriately for subsequent signal conditioning.

Each of the transceivers of the mobile device 20 has a different field of view. The fields of view of the transceivers may overlap to form a combined field of view. Each field of view may be up to 180 degrees, optionally between 90 and 180 degrees, in certain embodiments. The combined field of view may cover up to 360 degrees of the peripheral space about the mobile device, preferably between 270 degrees and 360 degrees. The fields of view of each transceiver may be substantially orthogonal to each other. In other embodiments, different transceivers may have the same field of view, or similar fields of view.

The mobile device may be, for example, a smartphone, a tablet, a laptop or other communication and/or computing device. The mobile device may be capable of communication using alternative communication protocols. For example, the mobile device may be capable to communicate using one of wireless mobile telecommunication, Wi-Fi, global positioning system, short message service, multimedia message service, Ethernet connection.

The mobile device 20 has an outer enclosure which has at least three surfaces. For example, a typical smartphone has 6 surfaces. The three transceivers of the present embodiment are arranged about the mobile device 20, as shown in FIGS. 2(a) and 2(b), as follows: a first transceiver 24 is on an upper surface, a second transceiver 26 is on a top surface and a third transceiver 28 is on a lower surface. The upper and lower surfaces are parallel to each other. The top surface is perpendicular to the upper and lower surfaces and provides a join.

As shown in FIGS. 2(a) and 2(b), the first transceiver 24 has a first transmitter 24a and a first receiver 24b; the second transceiver 26 has a first transmitter 26a and a first receiver 26b; and the third transceiver 28 has a third transmitter 28a and a third receiver 28b. The transceiver 30 of the access point 22 has an access point transmitter 30a for sending optical wireless signals and an access point receiver 30b for receiving optical wireless signals.

Figure 3:
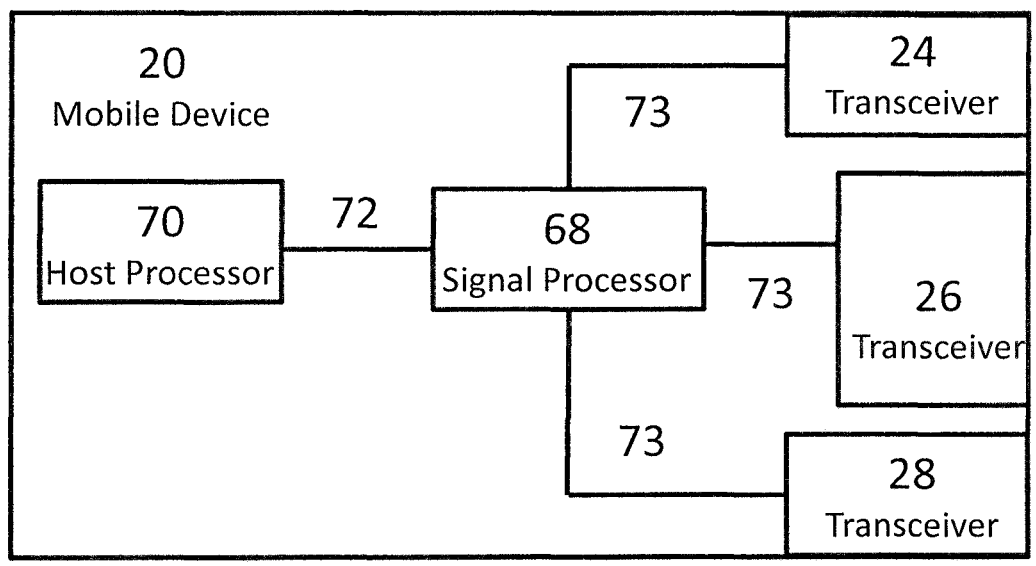
FIG. 3 is a schematic diagram of the mobile device.

FIG. 3 shows a schematic block diagram illustrating components of the mobile device 20 in more detail. In addition to the components shown in FIGS. 2(a) and 2(b), mobile device 20 has a signal processor 68 and a host processor 70. The mobile device 20 has a bus or interface 72 for carrying digital data signals between the signal processor 68 and the host processor. The mobile device also has one or more transceiver buses 73 or interfaces for carrying data signals between the signal processor 68 and the transceivers. Control signal data may also be carried by the transceiver buses or separate control buses provided between the signal processor 68 and the transceivers.

The signal processor 68 is configured to process signals received by the receivers to obtain optical wireless communication data and/or provide data signals to the transmitters to produce optical wireless communication signals. The signal processor 68 is further configured to send control signals to the transceivers. The signal processor 68 interacts with circuitry associated with the transmitter including driving circuitry to modulate data onto outgoing optical signals. The signal processor also interacts with circuitry associated with the transmitter to demodulate data from incoming optical signals, for example signal conditioning circuitry. While represented as a single processor, the signal processor 68 may be more than one processor, for example, one processor for controlling transmitters and one processor for demodulating the received signals.

The signal processor 68 is in communication with the three transceivers 24, 26 and 28. Signal processor 68 is configured to process detection signals from the receivers 24b, 26b and 28b to extract communication data and signal strength data. Signal processor 68 may also process at least one other further signal received from a further component of the mobile device 20 which may be provided by the host processor 70. The further component may provide data containing further position and/or orientation information. For example, the further component may comprise an accelerometer, a gyroscopic device, a GPS device or any other suitable device. In a further example, the further component may comprise an alternative communication module.

Signal processor 68 is configured to control the transmitters 24a, 26a and 28a, using control signals and/or data signals, to produce optical wireless communication signals. The signal processor controls transmitters using control signals that instruct the transmitters to produce optical signals and/or by selecting which transmitters data signals should be provided to. The control signals and/or selecting of transmitters may be based on processing of the received signals and/or on at least one further signal provided to the signal processor 68.

Figure 4:
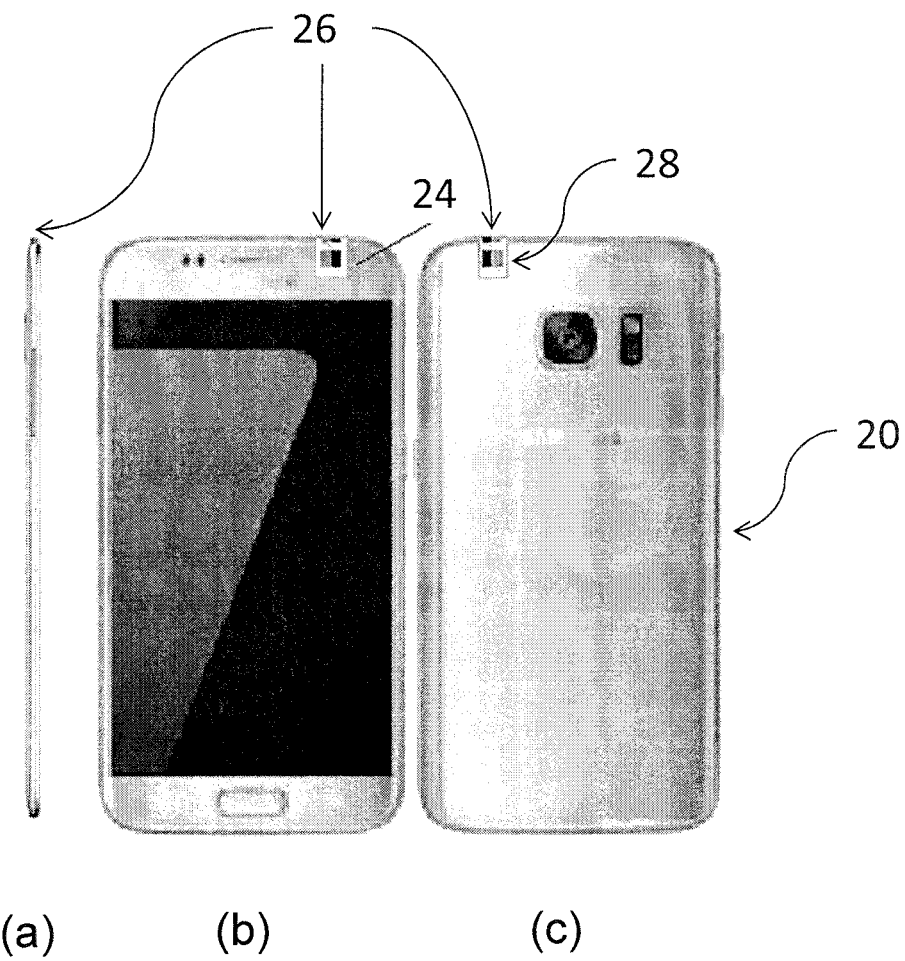
FIG. 4 shows three perspectives of a mobile device, and e)

FIG. 4 shows three perspective views of the mobile device 20 according to an embodiment. FIG. 4(a) shows a side view of mobile device 20. FIG. 4(b) shows a front view of mobile device 20. FIG. 4(c) shows a back view of mobile device 20. First transceiver 24 is shown on the upper surface of the mobile device 20. Second transceiver 26 is shown on the top surface of the mobile device 20 and third transceiver 28 is shown on the lower surface of the mobile device.

Figure 5A:
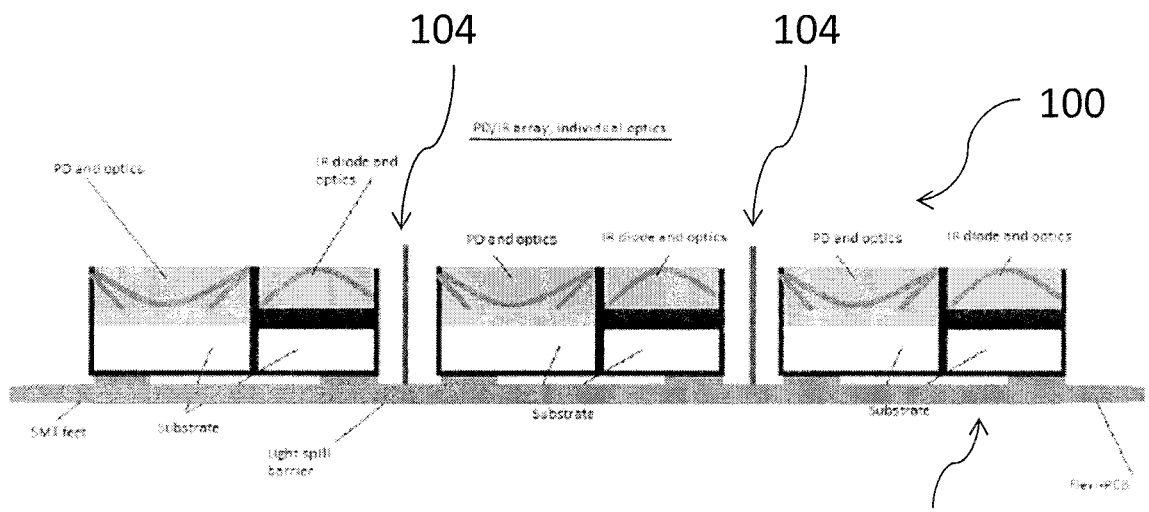
FIGS. 5(a) and 5(b) are schematic diagrams of a transceiver array.
Figure 5B:
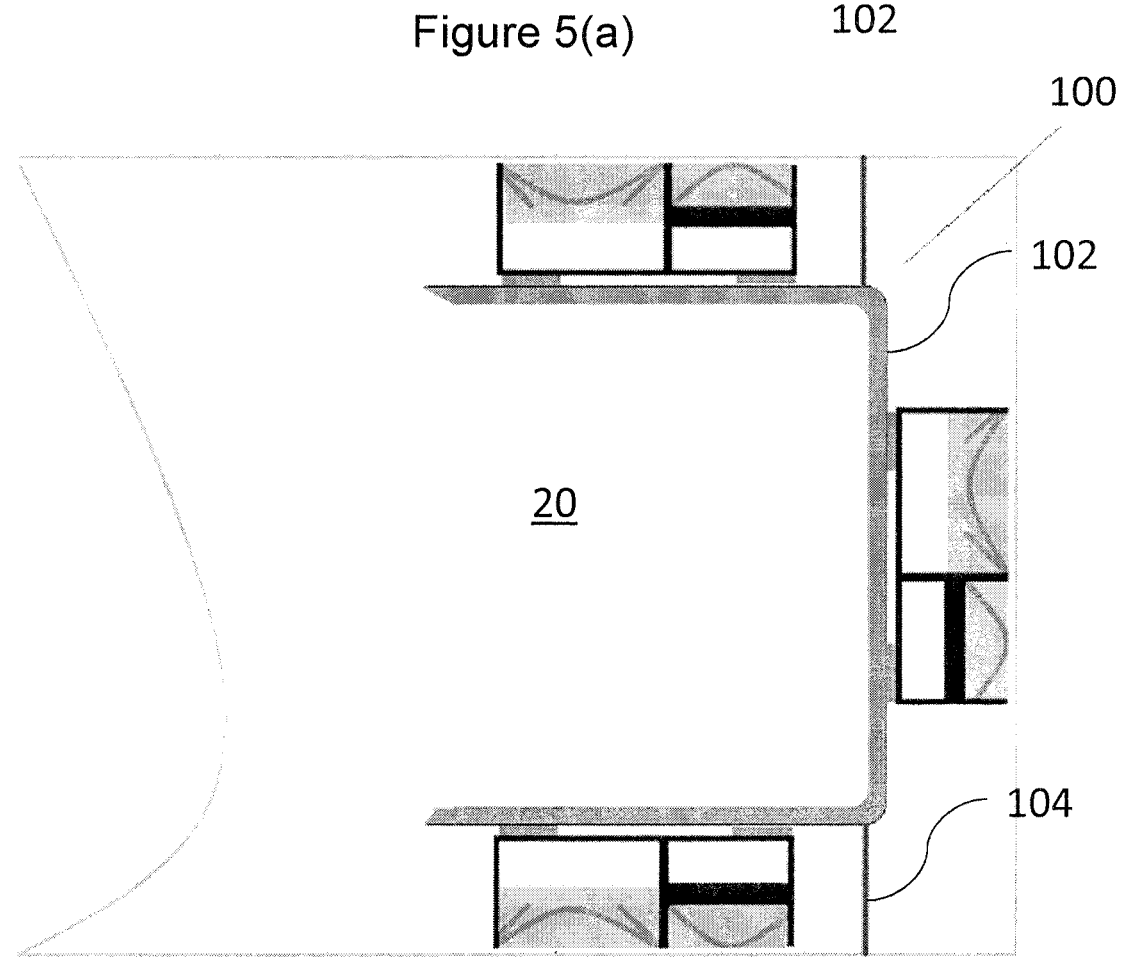

FIG. 5(a) shows a view of a transceiver module 100 providing three transceiver elements, for example transceivers 24, 26, 28. FIG. 5(b) shows the same module in an assembled state fitted to a mobile device 20. The assembly is configured to be fitted to a mobile device either by an end-user or in a factory setting, during production. The module may be swapped by a user. For example, the module may be swapped by a user to provide a different field of view and/or to provide a different wavelength or wavelengths of operation.

The transceiver elements may be surface mount technology (SMT) devices mounted on a printed circuit board. The transceiver elements may be contained in their own enclosures, so that the transceiver elements can be swapped or replaced. The transceiver enclosures may be detachable. The transceiver elements may be swapped for transceiver elements having a different field of view and/or different wavelength of operation.

The module 100 has an array of transceiver elements. When assembled, the array flows from one surface to an adjacent surface in a wrap-around fashion. The array shown in FIG. 5 shows a 1×3 transceiver element array. Any array size may be implemented.

The module 100 has three transceiver elements mounted on a flexible printed circuit board 102. The flexible printed circuit board can be flexed and curved around the edge of the mobile device 20 as shown in FIG. 5(b). As shown in FIG. 5, each transceiver element has a photodiode formed on a substrate layer and an infrared light emitting diode formed on a substrate layer. However, the transceiver elements may have more than one receiver and/or more than one transmitter. The transceiver elements sit on the circuit board via surface mount technology (SMT) feet. The SMT feet connect the transmitter and receiver electrically to the printed circuit board. The printed circuit board of the module may contain driving and/or signal conditioning circuity. Each photodiode has an associated optical component, for example a lens or a concentrator, for directing incoming light to the photodiode. Each infrared light emitting diode has an associated optical component, for example, a lens or a concentrator for directing light away from the light emitting diode. Advantageously, manufacturing the transceiver elements on a flexible printed circuit board provides an easier to install module for a mobile device.

The module also has two light barriers 104 provided on the printed circuit board. The light barrier is provided between adjacent transceiver elements. As shown in FIG. 5(b), the light barriers are provided to be substantially planar with the top surface of mobile device 20 in the assembled state. The light barrier prevents light from two adjacent transceiver elements interfering. The light barriers may be provided between different transmitter and/or different receivers.

Operation of the transceivers 24, 26, 28 of the mobile device 20 according to one mode of operation is now described.

Typically, the mobile device 20 is free to move relative to the access point 22. The access point 22 may be at a fixed location. Typically, a hand held mobile device will be moved in use.

The mobile device 20 and access point 22 communicate via at least one optical communication channel 32, as shown in FIG. 2(a). The optical communication channel 32 may be bi-directional and comprise an uplink 34 and a downlink 36. The optical communication channel 32 is formed as follows. An optical light communication signal can be emitted from the mobile device 20 from the mobile device transmitters 24a, 26a and 28a over a combined field of view, as shown in FIG. 2(b). Transmitter 24a of the mobile device 20 emits an optical communication signal over a first field of view 40; second transmitter 26a of the mobile device 20 emits an optical communication signal over a second field of view 42 and transmitter 28a of the mobile device emits an optical communication signal over a third field of view 44. The three optical communication signals are emitted in different directions, over different fields of view. The mobile device 20 is free to move and can be positioned such that the receiver 30b of the access point 22 is in at least one of the three fields 40, 42 and 44. In this position, the access point 22 can receive an optical communication signal sent by the mobile device 20. For example, for the mobile device 20 in a first orientation, as shown in FIGS. 2(a) and 2(b), the receiver 30b of the access point 22 is in the first field of view 40 and an uplink 34 is formed between the first transmitter 24a and the access point 22. When the uplink 34 is formed between the first transmitter 24a and the access point 22, the mobile device 20 may switch off transmitters 26a and 28a.

The transmitter 30a of the access point 22 can emit an optical communication signal over a further field of view 48 carrying data in the form of optical communication signals. The mobile device 20 positioned in the further field 48 can be linked to the access point 22 and receive a signal. The mobile device 20 is positioned such that at least one of the receivers 24b, 26b and 28b of the mobile device 20 is in the further field 48 and then the mobile device 20 can receive an optical communication signal sent by the access point 22. For example, for the mobile device 20 in the first orientation, as shown in FIGS. 2(a) and 2(b), the receiver 24b of the mobile device 20 is in the further field 48 and a downlink 36 is formed between the transmitter 30a of the access point 22 and the mobile device 20.

In the first orientation, a bi-directional communication channel 32 is established that enables the mobile device 20 to send data to and receive data from the access point 22.

As described above, FIGS. 2(a) and 2(b) show the mobile device in a first orientation. The mobile device 20 is free to move from a first orientation to a further orientation. For example, the mobile device 20 may be rotated about any one of its axes. Rotation of mobile device 20 is indicated in FIG. 2(a) by arrow 50. The mobile device 20 may also be translated from a first position to a second position through along one or more reference axes. Translation of the mobile device is indicated in FIG. 2(a) by arrow 52. Movement of the mobile device 20 may involve both translation and rotation of the mobile device 20.

Figure 6:
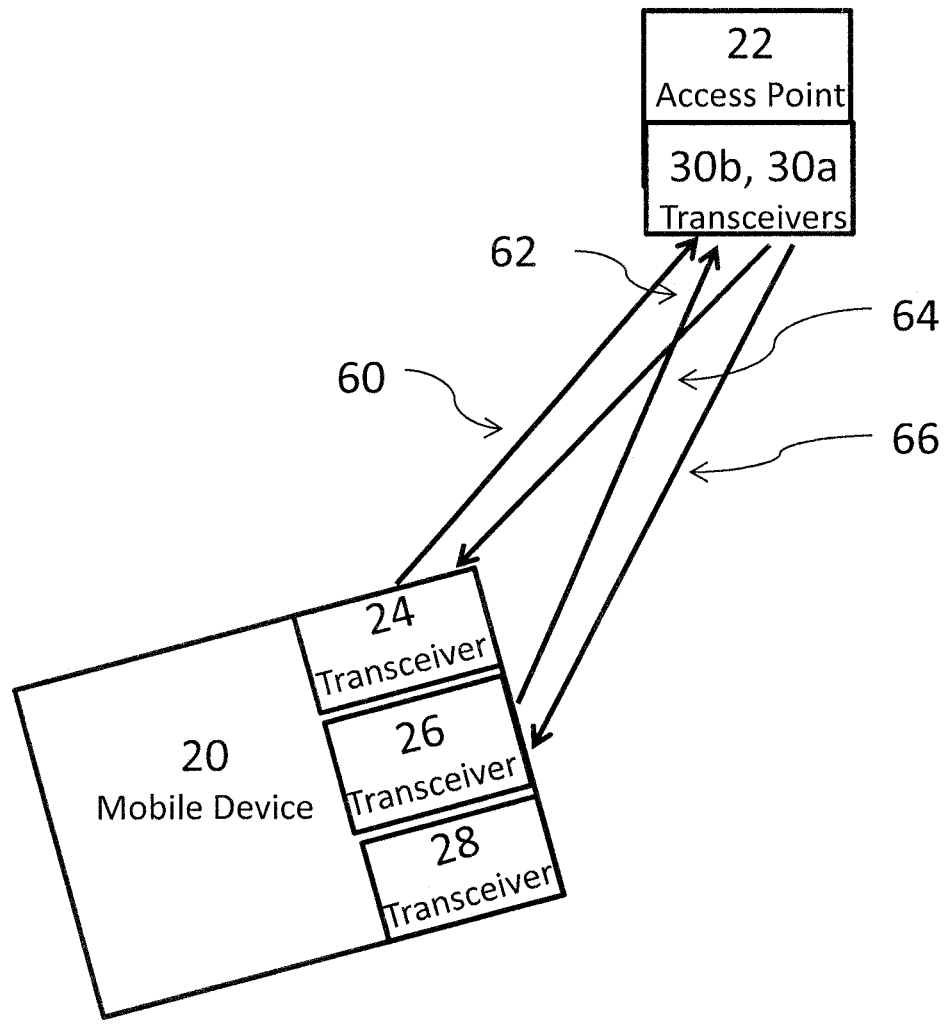
FIG. 6 is a schematic diagram of the mobile device, in a second orientation, communicating with the remote device using optical wireless communication.

FIG. 6 shows the mobile device 20 in a second orientation. The mobile device 20 has been rotated with respect to FIGS. 2(a) and 2(b). In the second orientation the field of view of each transceiver is changed with respect to the first orientation. In particular, the first field 40, the second field 42 and the third field 44 are rotated. In the second orientation, the receiver 30b of the access point 22 is in the first optical communication field 40 and the second optical communication field 42. A first uplink 60 is formed between the first transmitter 24a and the receiver 30b of the access point 22 and a second uplink is formed between the second transmitter 26a and the receiver 30b of the access point 22. The first receiver 24b and the second receiver 26b of the mobile device 20 are both in the further optical communication field 48 of the access point transmitter 30a. A first downlink 64 is formed between the transmitter 30a of the access point 22 and the first receiver 24b of the mobile device 20 and a second downlink 66 is formed between transmitter 30a of the access point 22 and the second receiver 24b of the mobile device 20.

In the second orientation, two bi-directional communication channels are created that enables the mobile device 20 to send data to and receive data from the access point 22.

Upon moving the mobile device from the first orientation, as shown in FIGS. 2(a) and 2(b), to the second orientation, as shown in FIG. 6, an optical communication link may be maintained, for example optical communication uplink 34 and/or downlink 36 of the first orientation is maintained as optical communication uplink 60 and downlink 64 of the second orientation. Furthermore, a new optical communication link may be established, for example, optical communication uplink 62 and optical communication downlink 66, in the second orientation, are established. In addition, further optical communication uplinks and/or downlinks may be established or lost on moving the mobile device 22.

Figure 7:
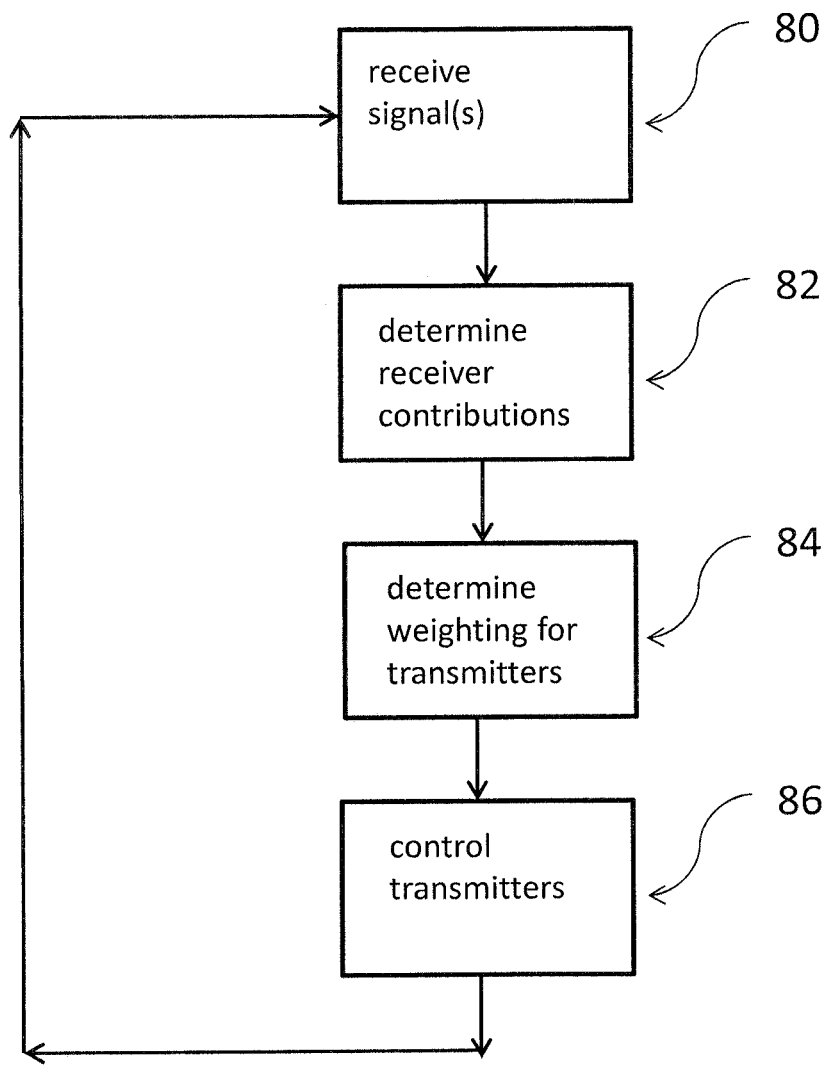
FIG. 7 shows a flowchart of an example process for controlling transmission of optical signals; and h)

An illustrative implementation of a signal processing method is shown in a flowchart of FIG. 7. The processing method of FIG. 7 is illustrative of general principles of controlling transmitters to produce optical signals based on received detection signals. The method of FIG. 7 is also later described with reference to movement between the first and second orientations.

At step 80, the signal processor 68 receives detection signals from the receivers. The signal processor 68 extracts signal strengths from the detection signals. The detection signals may contain signal strength information as part of a communication protocol, or the signal strength may be determined by another method. The signal processor 68 may also determine signal quality from the detection signals and/or the detection signals may contain signal quality information. Signal strength and/or signal quality may be determined using any suitable known method. For example, the signal processor 68 may receive or calculate a Received Signal Strength Indicator (RSSI) and/or signal to noise ratio (SNR) for the detection signals. The RSSI and SNR may be used to assess the received signal strength.

At step 82, the signal processor 68 processes the detection signals to determine a signal contribution from each receiver. The signal processor 68 processes the detection signals to determine which receiver(s) has detected a signal and therefore which transceiver has the access point 22 in its field of view. This step includes a comparison step using the signal strength of the received signals. As a first example, this step includes determining total signal strength by summing all detection signal strengths for the receivers. Relative contributions to the total signal strength for each receiver can then be determined, for example as a percentage or a proportion of the total signal strength, by comparing the individual signal strengths for each received signal to the total signal strength. The relative contributions can then be compared. As a second example, the signal strengths themselves can be compared.

As a further example, a suitable function of signal strength and signal quality can be used to determine a contribution of an individual receiver. In an example implementation, a scale factor may be applied to the signal contribution based on signal quality. For example, a first receiver may receive a significant contribution of the signal but have a poor signal quality and therefore its contribution is reduced.

At step 84, the signal processor determines a weighting for controlling transmitters. The weighting is based on the contributions calculated in step 82 and/or a further signal provided from a further component. The weighting contains information on which transmitters should be used to send optical signals. The weighting can indicate that only one transmitter should be used to send an optical signal. For example, the transceiver pair with the highest measured signal strength may be selected to send the optical signal only. Alternatively, a combination of more than one transmitter may be used to send an optical signal. If a combination of transmitters is used, then a weighting is applied to the transmitters.

At step 86, the signal processor 68 controls the transmitters to produce optical signals based on the weighting. Control of the transmitters may be performed by providing control signals to the transmitters and/or selecting which transmitters are sent data signals. Control signals and/or data signals are sent by transceiver buses 73 and/or separate control buses. In the simplest case, the weighting corresponds to simply turning on one or more of the transmitters.

An optional step, not shown, is for the signal processor 68 to provide a line of sight signal to the host processor 70 or other further component of the mobile device 20 based on the contribution determination. The line of sight signal carries signal strength information. The signal processor 68 or host processor 70 may use this information to determine a position and/or an orientation of the mobile device 20 relative to the access point 22.

As an example implementation, signal processing accompanying movement between the first and second orientation, as described above with reference to FIGS. 2 and 6, is now considered.

Turning to step 80, in the first orientation, an optical signal is received by the first receiver 24b of the mobile device and the first receiver 24b produces and provides a detection signal to signal processor 68 in response to receiving the optical signal. In the second orientation, optical signals are received by first receiver 24b and the second receiver 26b of the mobile device 20 and the first receiver 24b. Signal strength information is extracted from the detection signals. In the first orientation, second receiver 26b and third receiver 28b do not receive optical signals and therefore either provide detection signals that indicate that no optical signal is received or they provide no detection signal to the signal processor 68. In the second orientation, third receiver 28b does not receive optical signals and therefore either provides a detection signal that indicates that no optical signal is received or provides no detection signal to the signal processor 68.

On moving from the first orientation to the second orientation, the first receiver 24b continue to receive optical signals and the second receiver 26b begins to receive optical signals when the access point enters the field of view of the second receiver 26b.

At step 82, the signal processor 68 then processes the detection signals to determine which receiver has detected a signal and to determine the contributions of each signal to the total signal. In the first orientation, the signal processor 68 has only a non-zero signal strength value from the first receiver so can determine that the first receiver contributes the total signal. The ratio of signal strength contributions can be represented as 1:0:0. In the second orientation, the signal processor 68 has a signal strength value from the first receiver 24b and the second receiver 26b so can determine the first receiver and second receiver contributions to the total signal. The ratio of signal strength contributions can be represented as X:Y:0 where X is a value between 0 and 1, Y is a value between 0 and 1 and X+Y is substantially equal to 1.

On moving from the first orientation to the second orientation, the signal strength contributions change. The contribution of the first receiver 24b decreases and the contribution of the second receiver 26b increases.

At step 84, the signal processor determines a weighting for controlling the transmitters based on the above contributions. As previously discussed, the control of the transmitters may be implemented in several ways. In a first implementation, the weighting may be chosen such that the transceiver corresponding to the highest contribution to total signal is selected to send an optical signal. In the first orientation, only the first receiver 24b contributes so it has the highest contribution there the weighting is determined such that only the first transmitter 24a is selected to produce optical signals. In the second orientation, both the first and second receivers contribute. Therefore, if the contribution of the first receiver 24b is higher than the contribution of the second receiver 26b then the weighting is chosen such that only the first transmitter 24a will be instructed to send an optical signal and vice versa. On moving between the first and second orientation, the signal processor 68 may determine a weighting that switches optical signal production between the first and second transmitter. On moving between the first and second orientation, the signal processor 68 may determine a weighting that turns off the first transmitter 24a and turns on the second transmitter 26a.

In a second implementation, the weighting may be selected based on the values of the contributions. In the first orientation, only the first receiver 24b contributes so the weighting is determined such that only the first transmitter 24a is selected to produce optical signals. In the second orientation, both the first and second receivers contribute. Therefore, if the contribution of the first receiver 24b is represented as value X and the contribution of the first receiver 24b is represented as value Y, as described above, the weighting can be selected such that the first transmitter 24a produces a first proportion, based on value X, of the total outgoing optical signal and the second transmitter 24a produces a proportion, based on value Y, of the total outgoing optical signal. On moving between the first and second orientation, the weighting will change to reflect the changing optical fields.

In a third implementation, the weighting may be based on a threshold, such that the values of the relative contributions are compared to a threshold value and the weighting is determined based on the comparison. In the first orientation, only the contribution of the first receiver 24b can be above a predetermined threshold. In the second orientation, the contribution of the first receiver 24b and the contribution of the second receiver 26b will be above the predetermined threshold. A weighting is determined that instructs both transmitters to produce optical signals. On moving between the first and second orientations, the weighting will change.

At step 86, the signal processor uses the weighting to control the transmitters 24a, 26a and 28a. A first implementation includes sending data signals to be modulated to all transmitters together with control signals that indicate that only the first transmitter should generate optical signals. Alternatively, control may also be achieved by sending only a data signal to the first transmitter 24a and no data signals to the other transmitters. Control signals and/or data signals are sent by transceiver buses 73 and/or separate control buses.

At step 86, the signal processor uses the above weighting to control the transmitters 24a, 26a and 28a. The transmitters may be controlled, for example, by changing transmitter modulation depth in conjunction with transmitter offset level.

The signal processor 68 may process the detection signals from the receivers to produce a line of sight signal. In the case of more than one received signal, a comparison step is made by the signal processor to determine the relative strengths and/or relative quality of the detection signals. For example, if the first detection signal has a signal strength that is smaller than the signal strength of the second detection signal, then it can be determined that the second transceiver 26 has either a smaller distance to the access point or a clearer line of sight. In either case, the signal processor determines that the second transmitter is a preferred transmitter to send a subsequent optical signal from.

The comparison step may further comprise determining relative contributions to a total signal strength and/or signal quality, including summing signals from all receivers to calculate a total signal strength and/or total signal quality. Signals from individual transmitters can be compared to the total signal strength to determine individual contributions from each received signal to the total signal therefore measuring a weighting of signal contributions. The measured of received weightings can be used to determine a suitable output weighting for controlling transmitters.

Although transceiver elements are described that contain only one transmitter and receiver pair, in principle, any number of transmitters and receivers may be included. For example, the transceiver may be made up of an array of a first plurality of transmitters and an array of a second plurality of receivers. The first plurality and second plurality made have the same number and the same array size. An array of transmitters may include an array of individual light emitting diode units, each with a separate driving circuit and/or lens. Alternatively, the array of transmitters may include an array of light emitting diodes sharing one or more driving circuits and/or sharing one or more lenses.

Likewise, the array of receivers may include an array of individual photodiodes units, each with a separate conditioning and/or lens. Alternatively, the array of receivers may include an array of photodiodes sharing one or more driving circuits and/or sharing one or more lenses.

In certain embodiments described herein, the transmitter and receiver elements configured for optical wireless communication are in fixed positions with respect to surfaces of a mobile device such that each of three surfaces of the mobile device, for example two opposing surfaces and an orthogonal surface, has at least one OWC transmitter and/or such that each of the three surfaces has at least one OWC receiver.

In alternative embodiments, at least one of the transmitters and/or receivers provided at at least one of the surfaces is orientable with respect to the mobile device, for example with respect to a surface of the mobile device. For example, an alternative version of the embodiment of FIGS. 2a and 2b is provided in which one or more of transceiver 124, transceiver 126 or transceiver 128 is provided on a respective orientable member. The or each orientable member may be rotated around a respective at least one axis either manually by a user or, in some embodiments, under command of a controller.

Figure 8:
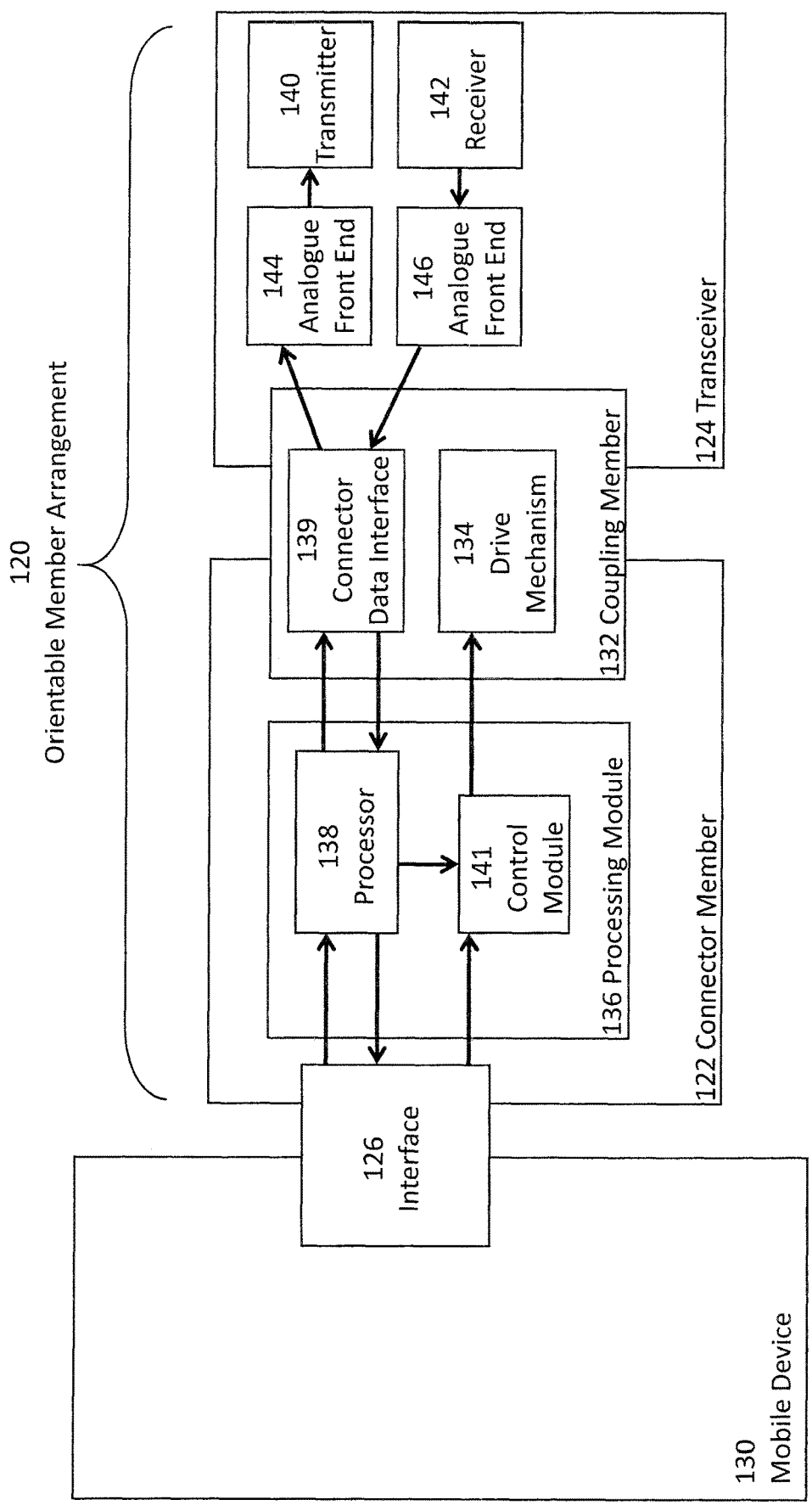
FIG. 8 is a schematic diagram of a mobile device according to a further embodiment.

FIG. 8 is schematic illustration of a schematic block diagram showing components of an orientable member on which a transceiver such as transceiver 124, 126 or 128 may be provided and oriented relative to a surface of the or a mobile device.

As described in more detail below, the orientable member arrangement 120 of a mobile device 130 includes a transceiver mounted on an orientable member 124 and comprising a transmitter 140 and a receiver 142. The orientable member is orientable to find an optimum angle for communication by the transceiver with a remote device, for example, an access point for providing data transmission to and/or from a wired network or a Wi-Fi™ or other RF wireless network or for providing transmission to and/or from an optical wireless communications network, optionally a LiFi network.

The orientable member arrangement 120 has a connector member 122 and an orientable member 124. The connector member 122 connects the device via an interface 126 to the mobile device 130. The connector member 122 thus provides a data interface between the orientable member arrangement 120 and mobile device 130.

The orientable member arrangement 120 has two main structural components connected together by a third structural component. The first component is a connector member 122. The second component is the orientable member 124 that accommodates the transceiver 140, 142 for optical wireless communication. Alternatively, the orientable member 124 may accommodate a receiver but no transmitter, or a transmitter but no receiver, in some embodiments.

The connector member 122 may include any suitable structural elements to provide a rotation mechanism, for example mechanical couplings, to enable rotation of the orientable member in a desired direction or directions, for example around pre-determined axis or axes with respect to the mobile device. Such structural elements can comprise one or more of bearing(s), spindle(s), gear(s), ratchet(s), coupling(s), joint(s), stop(s).

The orientable member arrangement 120 is operable to move between a first configuration and a second, rotated configuration and to maintain the orientable member in the second configuration, e.g the rotated position. In some cases a stop or lock or other mechanism may be included in the rotation mechanism to maintain the orientable member in the rotated configuration and/or the rotation mechanism may have sufficient stiffness, friction or inertia such that the orientable member remains in the rotated position unless a significant further force is applied. The movement between a first configuration and a second configuration may be manual, for example by end-user manipulation. Alternatively, or in addition, movement may be by electro-mechanical means, under software and/or electronic control. The movement between a first configuration and a second configuration may also be automatic. The control module 141 controls a drive mechanism 134 that drives the rotation of the orientable member 124.

The drive mechanism 134 may be electrically, magnetically and/or electro-magnetically powered.

In a non-automatic electro-mechanical embodiment, control signals may be provided by the mobile device 130 based on input by a user. The mobile device then instructs the control module 141 to rotate the orientable member through a certain angular distance.

In another embodiment, suitable control signals are automatically generated by the processing resource 138 or by a processor of the mobile device 130 based for example on one of received optical signal strength, received optical signal speed and/or a further signal.

The coupling member 132 couples the two components 122, 124 together, mechanically and electronically. Analogue circuitry for the transceiver is contained in the orientable member 124 and associated digital circuitry is contained in the connector member 122. In other embodiments, analogue circuitry may be contained in the orientable member 124 or in the connector member 122, or may be divided between the orientable member 124 and the connector member 122. The digital circuitry may be contained in the orientable member 124 or in the connector member 122, or may be divided between the orientable member 124 and the connector member 122. In other embodiments, the analogue circuitry and the digital circuitry may be provided in the main body of the mobile device 130 itself rather than in the members 122, 124.

In the embodiment of FIG. 8, the coupling member provides an interface for digital signals between the connector member 122 and the orientable member 124. The orientable module 124 is moved using a drive mechanism 134. The drive mechanism may be located in at least one of the connector member 122, the coupling member 132 and the orientable member 124.

The orientable member arrangement 120 has a processing module 136 located in the connector member 122. The processing module 136 has a processing resource 138 for processing optical wireless communication data signals and a control module 141 for sending control signals to the drive mechanism 134. In some embodiments, the processing resource 138 and the control module 141 are in communication with each other. The coupling member 132 has a connector data interface 139 permitting data signals to be communicated between the circuitry of the connector member 122 and the circuitry of the orientable member 124.

The orientable member 124 includes a transceiver 140, 142 and associated analogue front end circuitry. The transceiver is represented in FIG. 8 by a transmitter 140 and a receiver 142. In some embodiments, the transmitter may be, for example, an infrared light emitting diode (LED). The receiver 142 may be, for example, a photodiode. The receiver 142 is configured to receive light signals at a first wavelength, visible light in this embodiment, and the transmitter 140 is configured to transmit at a second different wavelength, infrared light in this embodiment.

The transmitter 140 has an associated analogue front end 144 which contains an associated driving circuit to drive the LED to produce the optical signal. The associated driving circuitry includes a digital to analogue convertor configured to provide a modulation signal at a frequency characteristic of an optical light communication signal. The analogue front end modulates a drive current using data and the driving circuitry provides the drive current to the LED. The LED then produces an outgoing modulated optical wireless communication signals that carries the data.

The photodiode of the receiver 142 has an associated analogue front end 146 which contains conditioning circuitry. The photodiode converts received light to an electronic signal which is then conditioned by the conditioning circuitry of the analogue front end 146. Conditioning may include at least one of: one or more filter steps; amplification of a weak electrical signal; equalisation of received signals and converting the analogue signals into digital signals using an analogue to digital convertor. The digital signals can then be provided to a further processor, for example the processing resource 138 of the connector member, to be demodulated to extract communication data.

Although description of the transmitter, receiver and associated circuitry of the embodiment of FIG. 8 is provided in the preceding paragraphs, it will be understood that in variants of the embodiment of FIG. 8, any of the transmitter, receiver and associated processing circuitry may be as described in relation to any of the other embodiments described herein. Furthermore, although the orientable member arrangement is shown schematically in FIG. 8 as being separate from, but connected to, the mobile device 130, in alternative embodiments the orientable member arrangement is an integral part of the mobile device, In some embodiments each of three surfaces of the mobile device has a respective associated orientable member arrangement such as the orientable member arrangement of the embodiment of FIG. 8. Each of the orientable arrangements may allow individual transceivers to be oriented at a desired angle with respect to an axis or axes. The axis or axes may be defined with respect to one or more of the surfaces of the mobile device, for example parallel to or perpendicular to one or more of the surfaces.

In some embodiments, each orientable member may have a default position in which the transceiver of the orientable member may be perpendicular to or parallel to the associated surface of the mobile device. A field of view of the transceiver may be parallel to or perpendicular to the associated surface in the default position in some embodiments. In the default position the transceiver and/or the orientable member may be flush with the associated surface or may have the lowest profile or protrude by a minimum amount with respect to a view perpendicular to the associated surface. In operation each orientable member may be orientable away from the default position, for example manually by a user or automatically, and/or under control of an associated processor. Each orientable member may be oriented for example, to maximise or minimise received or transmitted signal strength or to aim the transmitter and/or receiver towards or away from a receiver and/or transmitter of another device.

In some embodiments a further orientable member is provided that is connected to the first orientable member via further structural elements to enable relative rotation between the orientable member and the further orientable member. The rotation axis for rotation between the orientable member and the mobile device may be the same as or different to, for example perpendicular to, the rotation axis for rotation between the orientable member and the further orientable member. The transceiver may be provided at the further orientable member. Thus, an increased range of rotation angles, or rotation around more than one axis relative to the mobile device, can provided.

The orientable member and the further orientable member may also be referred to as a first portion and a second portion respectively of the orientable member. The second portion may be orientable relative to the first portion.

The first portion of the orientable member may be rotatably coupled to the second portion of the orientable member. In some embodiments, the first portion of the orientable member may be orientable by rotation relative to the connector member about a first axis by a first range of angles and the second portion of the orientable member is orientable by rotation relative to the first portion about a second axis by a second range of angles.

In some embodiments, the first axis may be substantially orthogonal to the second axis or the first axis is substantially parallel to the second axis. The first and second axes may be collinear such that the second portion is operable to rotate about an angle equal to the sum of the first angle and the second angle. Orientation of the orientable member may comprise rotation of the first portion and rotation of the second portion.

In embodiments, at least one the plurality of the transmitters and/or receivers is provided on the first portion and at least one of the plurality of the transmitters and/or receivers is provided on the second portion.

The orientable member is manually orientable by a user in some embodiments.

In some embodiments, the device 130 and/or the orientable member arrangement 120 further comprises a drive arrangement operable to orient the orientable member. The drive arrangement may be electrically, magnetically and/or electro-magnetically powered.

In some embodiments the mobile device 130 and/or the orientable member arrangement 120 further comprises an indicator for indicating signal strength of signals received at the receiver and/or transmitted by the transmitter.

In some embodiments, the indicator may comprise a visual indicator, for example, a light or a display. The indicator may be configured to provide an indication signal in response to signal strength being greater than or equal to a threshold value.

Some embodiments include a controller configured automatically to control orientation of the orientable member. The controller may comprise or form part of a processor of the mobile device 130. In some embodiments the controller is configured to control orientation of the orientable member based on at least one of:

a) signal strength of at least one signal received at the receiver or transmitted by the transmitter;
b) a control signal received from a further device or at least one additional device;
c) a measurement of orientation of the orientable device and/or the further device and/or a measurement of relative orientation of the orientable device and the further device.

In some embodiments the transceiver referred to in relation to particular embodiments may be replaced with a receiver or a transmitter. In some embodiments transmitters and/or receivers can be provided on their own orientable members, and a transmitter may be oriented to any one of a range of angles with respect to an associated receiver.

In a further embodiment, four transceiver elements are positioned at four corners of a mobile device, for example a mobile phone. The method of FIG. 7 may be performed using the four transceiver elements at the four corners.

A skilled person will appreciate that variations of the enclosed arrangement are possible without departing from the invention. Accordingly, the above description of the specific embodiment is made by way of example only and not for the purposes of limitations. It will be clear to the skilled person that minor modifications may be made without significant changes to the operation described.

The invention claimed is:
1. A mobile device comprising:
at least one of a plurality of transmitters or a plurality of receivers, wherein:
the at least one of the plurality of transmitters or the plurality of receivers are configured for optical wireless communication (OWC);
the at least one of the plurality of transmitters or the plurality of receivers are arranged on at least three surfaces of the mobile device such that each of the three surfaces has at least one of a respective at least one of the plurality of transmitters or a respective at least one of the plurality of receivers, wherein the mobile device further comprises a processor programmed to control an OWC transmission or reception process;
the processor is programmed to at least one of control or select the at least one of the plurality of transmitters to transmit OWC signals, wherein at least one of the controlling or the selecting of the at least one of the plurality of transmitters is determined by the processor using a weighting of received signals from the one or more receivers and at least one position or orientation signal received from a further component of the mobile device; and
the receiver is configured to receive light at a first wavelength and the transmitter is configured to transmit light at a second wavelength, and at least one of the first wavelength and second wavelength comprises an infrared wavelength.

2. The device according to claim 1, wherein at least some of the at least one of the plurality of transmitters or the plurality of receivers on different surfaces of the mobile device are provided on the same circuit board, the device further comprising the circuit board, and wherein the circuit board comprises a flexible circuit board.

3. The device according to claim 2, wherein the flexible circuit board comprises an array of at least one of the transmitters or receivers and the flexible circuit board is arranged so that the array wraps around the three surfaces.

4. The device according to claim 1, comprising transceiver elements that comprise the plurality of transmitters and receivers.

5. The device according to claim 4, wherein the transceiver elements are detachable.

6. The device according to claim 4, wherein one or more of the transceiver elements is swappable for one or more other transceiver elements having a different field of view or wavelength of operation.

7. The device according to claim 4, further comprising one or more enclosures each for receiving a respective one or more of the transceiver elements.

8. The device according to claim 7, wherein each of the one or more enclosures comprises a light barrier for blocking light from a transceiver element of other of the enclosures.

9. The device according to claim 4, wherein the transceiver elements are surface mount technology (SMT) devices.

10. The device according to claim 2, wherein the flexible circuit board comprises or forms part of a module that is fitted to the mobile device.

11. The device according to claim 1, wherein the at least three different surfaces comprise two opposing surfaces and a surface that is orthogonal to the two opposing surfaces.

12. The device according to claim 1, wherein the at least one of the plurality of transmitters or the plurality of receivers are arranged so that each at least one of transmitter or receiver has a different field of view.

13. The device according to claim 1, wherein at least one of
the plurality of transmitters is arranged to have a combined field of view of at least 180 degrees or to have a combined field of view of at least 270 degrees or to have a combined field of view of at least at least 360 degrees; or
the plurality of receivers is arranged to have a combined field of view of at least 180 degrees, optionally at least 270 degrees, optionally at least 360 degrees.

14. The device according to claim 1, wherein at least one of
- the field of view of at least one of the transmitters is orthogonal to the field of view of at least one other of the transmitters; or
- the field of view of at least one of the receivers is orthogonal to the field of view of at least one other of the receivers.

15. The device according to claim 1, further comprising a light barrier between the at least one of the plurality of transmitters or the plurality of receivers and at least one other of the at least one of the plurality of transmitters or the plurality of receivers.

16. The device as claimed in claim 15, wherein the light barrier comprises at least one of the light barrier between at least one of the transmitters and at least one other of the transmitters, or the light barrier between at least one of the receivers and at least one other of the receivers.

17. The device according to claim 1, configured to communicate using a further communication protocol in addition to optical wireless communication.

18. The device according to claim 17, wherein the further communication protocol comprises at least one of: a radio-frequency communication protocol, wireless mobile telecommunication, Wi-Fi, global positioning system, short message service, multimedia message service, or Ethernet connection.

19. The device according to claim 1, wherein the device comprises at least one of: a smartphone, a mobile telephone, a tablet, a laptop, other communication device or other computing device.

20. The device according to claim 1, wherein the processor is configured to at least one of select one or more of the receivers for use in the reception process or selectively process received signals from the receivers, in dependence on one or more of received signal strength, received signal quality, position of the mobile device, orientation of the mobile device.

21. The device according to claim 1, wherein each at least one of transmitter or receiver has an associated optical component for directing light at least one of to or from the associated at least one of transmitter or receiver.

22. The device according to claim 1, wherein the further signal comprises a signal from at least one of an accelerometer or a gyroscopic device.

23. The device according to claim 4, further comprising a transceiver module comprising the transceiver elements arranged as at least one transceiver array.

24. The device according to claim 23, wherein the transceiver module comprises a light barrier between adjacent of the transceiver elements.

25. The device according to claim 4, wherein one or more of the transceiver elements are plug-in devices and may be removed or replaced by one or more other transceiver elements.

26. The device according to claim 25, wherein the other transceiver element has a different field of view or different wavelength of operation to that of the one or more transceiver elements being replaced.

27. A method of controlling the device according to claim 1, wherein at least one of controlling or selecting the at least one of the plurality of transmitters by the processor is based on determining or assessing a detection signal strength received for the at least one of the receivers and determining a weighting for controlling or selecting the at least one transmitter to send an optical signal based wherein the weighting is based on at least one of detection signal strength or a further position or orientation signal.

* * * * *